(12) United States Patent
Veenman et al.

(10) Patent No.: US 9,057,925 B2
(45) Date of Patent: Jun. 16, 2015

(54) FILL PORT PLUGS FOR ELECTROCHROMIC DEVICES

(71) Applicant: Gentex Corporation, Zeeland, MI (US)

(72) Inventors: Steven J. Veenman, Grandville, MI (US); Leroy J. Kloeppner, Jenison, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/207,250

(22) Filed: Mar. 12, 2014

(65) Prior Publication Data

US 2014/0268279 A1 Sep. 18, 2014

Related U.S. Application Data

(60) Provisional application No. 61/791,413, filed on Mar. 15, 2013.

(51) Int. Cl.
*G02F 1/15* (2006.01)
*G02F 1/161* (2006.01)

(52) U.S. Cl.
CPC ...................................... *G02F 1/161* (2013.01)

(58) Field of Classification Search
CPC ............................ G02F 2202/023; G02F 1/155
USPC ........ 359/265–275, 900; 345/105; 156/275.5, 156/275.7, 330; 522/6, 8, 11, 12
See application file for complete search history.

(56) References Cited

U.S. PATENT DOCUMENTS

| | | |
|---|---|---|
| 3,215,038 A | 11/1965 | Heller et al. |
| 3,280,701 A | 10/1966 | Donnelly et al. |
| 3,451,741 A | 6/1969 | Manos |
| 3,453,038 A | 7/1969 | Kissa et al. |
| 3,521,941 A | 7/1970 | Deb et al. |

(Continued)

FOREIGN PATENT DOCUMENTS

| | | |
|---|---|---|
| JP | 2085388 | 3/1990 |
| WO | WO-98/42796 | 10/1998 |
| WO | WO 99/02621 | 1/1999 |

OTHER PUBLICATIONS

Notice of Allowance in U.S. Appl. No. 13/731,615 dtd Jun. 12, 2014 (9 pages).

(Continued)

*Primary Examiner* — Tuyen Tra
(74) *Attorney, Agent, or Firm* — Foley & Lardner LLP; Scott P. Ryan

(57) ABSTRACT

An electrochromic device including: a first substantially transparent substrate having an electrically conductive material associated therewith; a second substrate having an electrically conductive material associated therewith; an electrochromic medium contained within a chamber positioned between the first and second substrates which includes: at least one solvent; at least one anodic material; and at least one cathodic material, wherein both of the anodic and cathodic materials are electroactive and at least one of the anodic and cathodic materials is electrochromic; wherein at least one of a seal member, the first substrate, the second substrate, and the chamber includes a plug associated with a fill port; and wherein the plug is at least partially cured with at least one photoinitiator and at least one photosensitizer upon exposure to electromagnetic radiation having a wavelength from about 350 nm to about 420 nm.

20 Claims, 9 Drawing Sheets

(56) References Cited

U.S. PATENT DOCUMENTS

| | | |
|---|---|---|
| 3,652,149 A | 3/1972 | Rogers |
| 3,692,388 A | 9/1972 | Hall et al. |
| 3,774,988 A | 11/1973 | Rogers |
| 3,806,229 A | 4/1974 | Schoot et al. |
| 3,807,832 A | 4/1974 | Castellion |
| 3,854,794 A | 12/1974 | Van Dam et al. |
| 3,873,185 A | 3/1975 | Rogers |
| 4,116,545 A | 9/1978 | Reddy |
| 4,139,234 A | 2/1979 | Morgan |
| 4,142,783 A | 3/1979 | Engler et al. |
| 4,174,152 A | 11/1979 | Giglia et al. |
| 4,227,779 A | 10/1980 | Bissar et al. |
| 4,282,272 A | 8/1981 | Matsuhiro et al. |
| 4,294,518 A | 10/1981 | O'Connor et al. |
| 4,297,401 A | 10/1981 | Chern et al. |
| RE30,835 E | 12/1981 | Giglia |
| 4,304,465 A | 12/1981 | Diaz |
| 4,306,774 A | 12/1981 | Nicholson |
| 4,338,000 A | 7/1982 | Kamimori et al. |
| 4,418,102 A | 11/1983 | Ferrato |
| 4,435,048 A | 3/1984 | Kamimori et al. |
| 4,440,910 A | 4/1984 | O'Connor |
| 4,449,786 A | 5/1984 | McCord |
| 4,465,339 A | 8/1984 | Baucke et al. |
| 4,473,695 A | 9/1984 | Wrighton et al. |
| 4,519,930 A | 5/1985 | Kakiuchi |
| 4,550,982 A | 11/1985 | Hirai |
| 4,561,625 A | 12/1985 | Weaver |
| 4,586,792 A | 5/1986 | Yang et al. |
| 4,613,211 A | 9/1986 | Papir et al. |
| 4,652,090 A | 3/1987 | Uchikawa et al. |
| 4,671,619 A | 6/1987 | Kamimori et al. |
| 4,695,490 A | 9/1987 | McClelland et al. |
| 4,702,566 A | 10/1987 | Tukude |
| 4,712,879 A | 12/1987 | Lynam et al. |
| 4,741,603 A | 5/1988 | Miyagi et al. |
| 4,750,817 A | 6/1988 | Sammells |
| 4,761,061 A | 8/1988 | Nishiyama et al. |
| 4,795,242 A | 1/1989 | Wudl et al. |
| 4,807,977 A | 2/1989 | Sammells |
| 4,810,067 A | 3/1989 | Demiryont |
| 4,824,221 A | 4/1989 | Endo et al. |
| 4,832,467 A | 5/1989 | Miyagi et al. |
| 4,852,979 A | 8/1989 | Agrawal |
| 4,871,236 A | 10/1989 | Gemma et al. |
| 4,872,745 A | 10/1989 | Fujisawa et al. |
| 4,893,908 A | 1/1990 | Wolf et al. |
| 4,902,108 A | 2/1990 | Byker |
| 4,908,283 A | 3/1990 | Takahashi et al. |
| 4,927,246 A | 5/1990 | Ito et al. |
| 4,962,158 A | 10/1990 | Kobayashi et al. |
| 4,973,844 A | 11/1990 | O'Farrell et al. |
| 4,993,810 A | 2/1991 | Demiryont |
| 5,028,124 A | 7/1991 | Akhtar |
| 5,042,923 A | 8/1991 | Wolf et al. |
| 5,066,112 A | 11/1991 | Lynam et al. |
| 5,068,062 A | 11/1991 | Inata et al. |
| 5,073,012 A | 12/1991 | Lynam |
| 5,076,674 A | 12/1991 | Lynam |
| 5,080,471 A | 1/1992 | Cogan et al. |
| 5,115,346 A | 5/1992 | Lynam |
| 5,122,896 A | 6/1992 | Mizusaki et al. |
| 5,128,799 A | 7/1992 | Byker |
| 5,134,175 A | 7/1992 | Lucey |
| 5,140,455 A | 8/1992 | Varaprasad et al. |
| 5,142,407 A | 8/1992 | Varaprasad et al. |
| 5,148,014 A | 9/1992 | Lynam et al. |
| 5,151,816 A | 9/1992 | Varaprasad et al. |
| 5,180,757 A | 1/1993 | Lucey |
| 5,202,787 A | 4/1993 | Byker et al. |
| 5,206,756 A | 4/1993 | Cheshire |
| 5,207,492 A | 5/1993 | Roberts |
| 5,231,531 A | 7/1993 | Defendini et al. |
| 5,233,461 A | 8/1993 | Dornan et al. |
| 5,239,405 A | 8/1993 | Varaprasad et al. |
| 5,239,406 A | 8/1993 | Lynam |
| 5,278,693 A | 1/1994 | Theiste et al. |
| 5,280,380 A | 1/1994 | Byker |
| 5,282,077 A | 1/1994 | Byker |
| 5,353,148 A | 10/1994 | Eid et al. |
| 5,356,947 A | 10/1994 | Ali et al. |
| 5,360,837 A | 11/1994 | Honda et al. |
| 5,457,218 A | 10/1995 | Cronin et al. |
| 5,500,760 A | 3/1996 | Varaprasad et al. |
| 5,554,664 A | 9/1996 | Lamanna et al. |
| 5,567,749 A | 10/1996 | Sawamura et al. |
| 5,572,354 A | 11/1996 | Desmond et al. |
| 5,576,687 A | 11/1996 | Blank et al. |
| 5,596,023 A | 1/1997 | Tsubota et al. |
| 5,596,024 A | 1/1997 | Horie et al. |
| 5,679,283 A | 10/1997 | Tonar et al. |
| 5,790,298 A | 8/1998 | Tonar |
| 5,818,625 A | 10/1998 | Forgette et al. |
| 5,910,854 A | 6/1999 | Varaprasad et al. |
| 5,928,572 A | 7/1999 | Tonar et al. |
| 5,998,617 A | 12/1999 | Srinivasa et al. |
| 6,020,987 A | 2/2000 | Baumann et al. |
| 6,037,471 A | 3/2000 | Srinivasa et al. |
| 6,063,839 A | 5/2000 | Oosedo et al. |
| 6,137,620 A | 10/2000 | Guarr et al. |
| 6,141,137 A | 10/2000 | Byker et al. |
| 6,157,480 A | 12/2000 | Anderson et al. |
| 6,165,386 A | 12/2000 | Endo et al. |
| 6,166,849 A | 12/2000 | Coleman et al. |
| 6,188,505 B1 | 2/2001 | Lomprey et al. |
| 6,193,912 B1 | 2/2001 | Thieste et al. |
| 6,241,916 B1 | 6/2001 | Claussen et al. |
| 6,242,602 B1 | 6/2001 | Giri et al. |
| 6,249,369 B1 | 6/2001 | Theiste et al. |
| 6,361,879 B1 | 3/2002 | Tsutsumi et al. |
| 6,420,036 B1 | 7/2002 | Varaprasad et al. |
| 6,519,072 B2 | 2/2003 | Nishikitani et al. |
| 6,521,354 B1 | 2/2003 | Shimizu et al. |
| 6,535,322 B2 | 3/2003 | Asano et al. |
| 6,555,187 B1 | 4/2003 | Kitamura |
| 6,569,361 B1 | 5/2003 | Berneth et al. |
| 6,597,489 B1 | 7/2003 | Guarr et al. |
| 6,620,510 B1 | 9/2003 | Taguchi et al. |
| 6,671,080 B2 * | 12/2003 | Poll et al. .................... 359/275 |
| 6,700,692 B2 | 3/2004 | Tonar et al. |
| 6,710,906 B2 | 3/2004 | Guarr et al. |
| 6,714,334 B2 | 3/2004 | Tonar |
| 6,787,606 B1 | 9/2004 | Chen |
| 6,906,842 B2 | 6/2005 | Agrawal et al. |
| 7,046,418 B2 | 5/2006 | Lin et al. |
| 7,047,633 B2 | 5/2006 | Morganelli et al. |
| 7,075,112 B2 | 7/2006 | Roberts et al. |
| 7,182,830 B2 | 2/2007 | Liang et al. |
| 7,190,505 B1 | 3/2007 | Stray et al. |
| 7,202,987 B2 | 4/2007 | Varaprasad et al. |
| 7,372,611 B2 | 5/2008 | Tonar et al. |
| 7,450,292 B1 | 11/2008 | Burrell et al. |
| 7,494,231 B2 | 2/2009 | Varaprasad et al. |
| 8,345,345 B2 | 1/2013 | Veenman et al. |
| 8,599,466 B2 | 12/2013 | Agrawal et al. |
| 2002/0015214 A1 | 2/2002 | Nishikitani et al. |
| 2011/0176195 A1 | 7/2011 | Veenman et al. |

OTHER PUBLICATIONS

International Search Report and Written Opinion in International Application No. PCT/US2014/024942 dtd Aug. 7, 2014 (7 pages).
US 5,148,305, Sep. 1992, Byker (withdrawn).
Ciba IRGACURE 651, Ciba Specialty Chemicals, Edition 4.9.2001, accessed at http://people.rit.edu/deeemc/courses/0305-676/reference/Imprint/irgacure_651.pdf.
International Search Report and Written Opinion of the International Searching Authority in PCT/US2008/008064 dtd Sep. 9, 2008.
Non-Final Office Action in U.S. Appl. No. 13/731,615 dtd Feb. 6, 2014 (16 pages).

* cited by examiner

FILL PORT PLUGS FOR ELECTROCHROMIC DEVICES

CROSS-REFERENCE TO RELATED APPLICATIONS

This application claims the benefit of priority to U.S. Provisional Patent Application No. 61/791,413, filed Mar. 15, 2013, which is incorporated herein by reference for any and all purposes.

FIELD

The present technology is generally related to electrochromic devices. More particularly it is related to the fill port and associated plug materials used to introduce, and enclose, electrochromic materials to, and within, a cell.

BACKGROUND

Electrochromic devices have been known in the art for several years. Furthermore, electrochromic devices having plugs associated with fill ports are likewise well known.

Although such fill port plugs have been readily utilized, issues relative to plug curability, compatibility, and/or reliability remain paramount to the commercialized success of electrochromic devices. Such electrochromic devices include electrochromic mirrors, electrochromic eyewear, electrochromic windows, and electrochromic aircraft transparencies. Indeed, incomplete plug curing and/or failure can not only render an associated electrochromic device inoperable, but leakage of the electrochromic medium contained within the electrochromic device can also substantially damage the interior of, for example, an automobile, building, and/or aircraft. In addition, a poorly cured plug may lead to gas permeability and/or poor barrier properties of a plug, compromising the longevity and/or functionality of an associated device.

SUMMARY

In one aspect, an electrochromic device is provided, the device including a first substantially transparent substrate having an electrically conductive material associated therewith; a second substrate having an electrically conductive material associated therewith; and an electrochromic medium contained within a chamber positioned between the first and second substrates which includes: at least one solvent; at least one anodic material; and at least one cathodic material, wherein both of the anodic and cathodic materials are electroactive and at least one of the anodic and cathodic materials is electrochromic; wherein at least one of a seal member, the first substrate, the second substrate, and the chamber includes a plug associated with a fill port. The plug may be at least partially cured with at least one photoinitiator and at least one photosensitizer upon exposure to electromagnetic radiation having a wavelength from about 350 nm to about 420 nm. In some embodiments, the plug may be at least partially cured with at least one photoinitiator and at least one photosensitizer upon exposure to electromagnetic radiation having a wavelength from about 350 nm to about 400 nm.

In any of the above embodiments, at least one of the first substrate and the second substrate includes the plug associated with the fill port.

In any of the above embodiments, the plug includes an epoxy resin, such as, but not limited to, a bisphenol A epoxy resin, a bisphenol F epoxy resin, a bisphenol A/F epoxy resin, a modified bisphenol A/F epoxy resin, a cyclohexyl epoxy resin, an isocyanurate epoxy resin, or a combination of any two or more thereof.

In any of the above embodiments, the at least one photoinitiator includes a cationic photoinitiator.

In any of the above embodiments, the cationic photoinitiator may include a phosphate photoinitiator, an antimonate photoinitiator, or combination of any two more thereof. This includes, but is not limited to, a sulfonium antimonate, an arylsulfonium antimonate, a triarylsulfonium antimonate, a triarylsulfonium hexafluoroantimonate, a mixed triarylsulfonium hexafluoroantimonate, an iodonium antimonate, an aryliodonium antimonate, a bisaryliodonium antimonate, a bisaryliodonium hexafluoroantimonate, a sulfonium phosphate, an arylsulfonium phosphate, a trisarylsulfonium phosphate, a trisarylsulfonium hexafluorophosphate, a mixed trisarylsulfonium hexafluorophosphate, an iodonium phosphate, an aryliodonium phosphate, a bisaryliodonium phosphate, a bisaryliodonium hexafluorophosphate, or a combination of any two or more thereof.

In any of the above embodiments, the cationic photoinitiator may be a compound represented by Formula (I):

wherein $R^1$ and $R^2$ are individually H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing about 1 to about 50 carbon atom(s), or combination of any two or more thereof; and wherein $[X]^-$ includes $AsF_6^-$, $SbF_6^-$, $PF_6^-$, $Ga(C_6F_5)_4^-$, $B(C_6F_5)_4^-$, $7,8,9,10,11,12\text{-}CB_{11}H_6Br_6^-$, $(C_6F_5)_3B^-(C_6F_4)B^-(C_6F_5)_3$, perfluorobutane sulfonate, p-toluene sulfonate, trifluoromethanesulfonate, nitrate, borates,

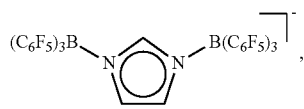

and other compatible ions. In some embodiments, $R^1$ and $R^2$ are individually aryl or alkaryl. In any such other embodiments, $R^1$ and $R^2$ are individually, phenyl, a 2-($C_1$-$C_{10}$ alkyl)phenyl, a 3-($C_1$-$C_{10}$ alkyl)phenyl, a 4-($C_1$-$C_{10}$ alkyl)phenyl, or a bis($C_1$-$C_{10}$ alkyl)phenyl. The cationic photoinitiator may be a compound represented by Formula II:

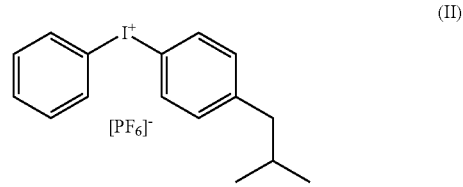 [SMILES: CC(C)Cc1ccc([I+]c2ccccc2)cc1]

In any of the above embodiments, the photosensitizer may be a compound represented by Formula III:

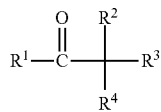
(III)

wherein $R^1$-$R^4$ are individually H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing about 1 to about 50 carbon atom(s), or a combination of any two or more thereof. In some embodiments, $R^1$ and $R^3$ are individually aryl or alkaryl. In any such other embodiments, $R^1$ and $R^3$ are individually, phenyl. In some embodiments, $R^2$ and $R^4$ are individually alkyl, hydroxy, or alkoxy. In any such other embodiments, $R^2$ and $R^3$ may be a $C_1$-$C_4$ alkoxy. This may include where the ketone photoinitiator is a compound represented by Formula IV:

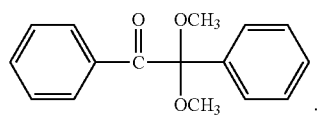
(IV)

Illustrative photosensitizers may include, but are not limited to, unsubstituted xanthones, substituted xanthones, unsubstituted thioxanthones, substituted thioxanthones, or a combination of any two or more thereof. In any of the above embodiments, the plug may further include fumed silica, such as, but not limited to, fumed silica treated with polydimethylsiloxane.

In any of the above embodiments, the electrochromic medium may further include at least one of a cross-linked polymer matrix, a free-standing gel, a substantially non-weeping gel, and/or an oxidation/reduction buffer.

In any of the above embodiments, the plug may include a cure indicator and/or a slipcover.

In another aspect, an electrochromic device is provided including a first substantially transparent substrate having an electrically conductive material associated therewith; a second substrate having an electrically conductive material associated therewith; and an electrochromic medium contained within a chamber positioned between the first and second substrates which includes: at least one solvent; at least one anodic material; and at least one cathodic material, wherein both of the anodic and cathodic materials are electroactive and at least one of the anodic and cathodic materials is electrochromic; wherein at least one of a seal member, the first substrate, the second substrate, and the chamber includes a plug associated with a fill port; and wherein the plug includes an epoxy resin. The plug may be at least partially cured with at least one photoinitiator and at least one photosensitizer upon exposure to electromagnetic radiation having a wavelength from about 350 nm to about 420 nm. In some embodiments, the plug may be at least partially cured with at least one photoinitiator and at least one photosensitizer upon exposure to electromagnetic radiation having a wavelength from about 350 nm to about 400 nm. The photosensitizer may be a xanthone, a thioxanthone, a mixture of xanthones, a mixture of thioxanthones, or a combination of any two or more thereof.

In another aspect, a method is provided for manufacturing an electrochromic device, the method including providing an electrochromic device including a first substantially transparent substrate having an electrically conductive material associated therewith; a second substrate having an electrically conductive material associated therewith; and an electrochromic medium contained within a chamber positioned between the first and second substrates which includes: at least one solvent; at least one anodic material; and at least one cathodic material, wherein both of the anodic and cathodic materials are electroactive and at least one of the anodic and cathodic materials is electrochromic; at least partially closing a fill port associated with at least one of a seal member, the first substrate, the second substrate, and the chamber with an uncured plug; and exposing the uncured plug to electromagnetic radiation having a wavelength from about 350 nm to about 420 nm to, in turn, substantially convert the plug from an uncured state to an cured state. In some embodiments, the uncured plug may be cured with at least one photoinitiator and at least one photosensitizer upon exposure to electromagnetic radiation having a wavelength from about 350 nm to about 400 nm.

DETAILED DESCRIPTION

Figure 1:
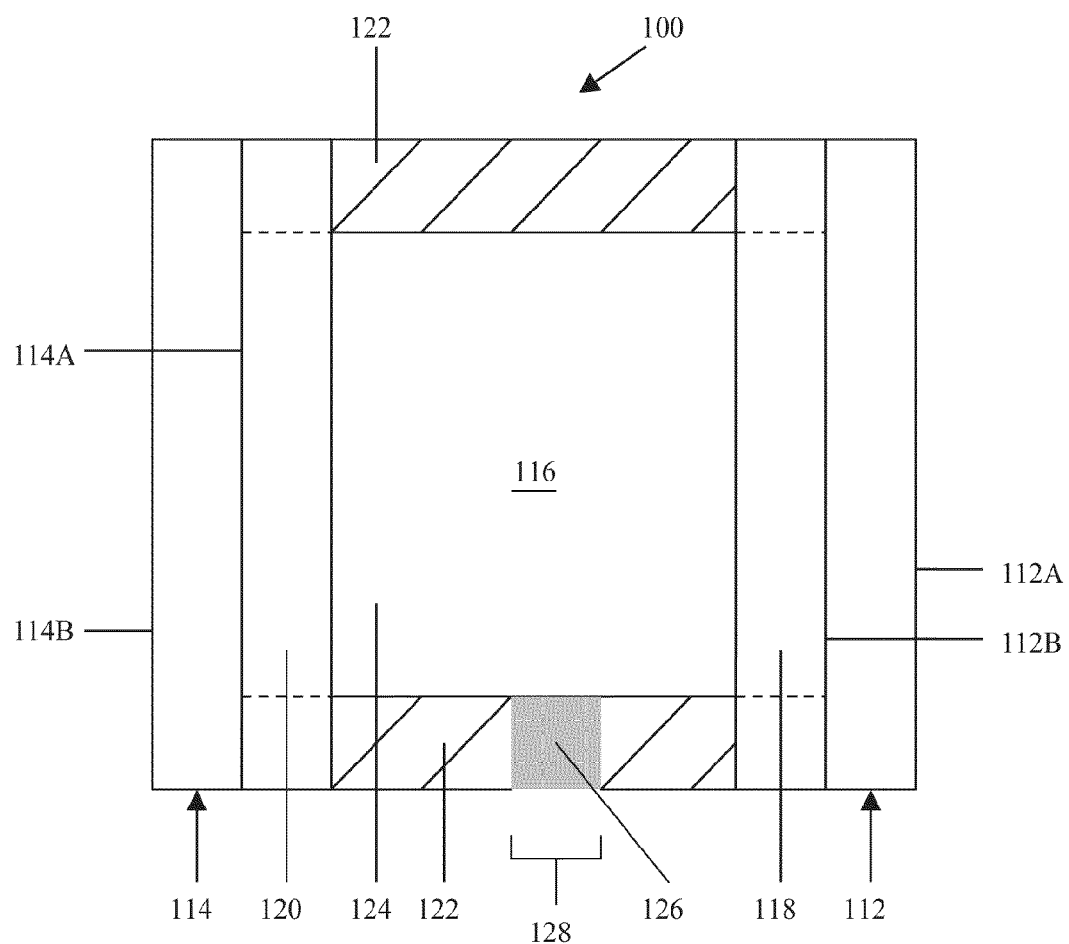
FIG. 1 is a cross-sectional schematic representation of an electrochromic device fabricated showing, among other things, a plug associated with a fill port of a conventional seal member, according to one embodiment.
Figure 2:
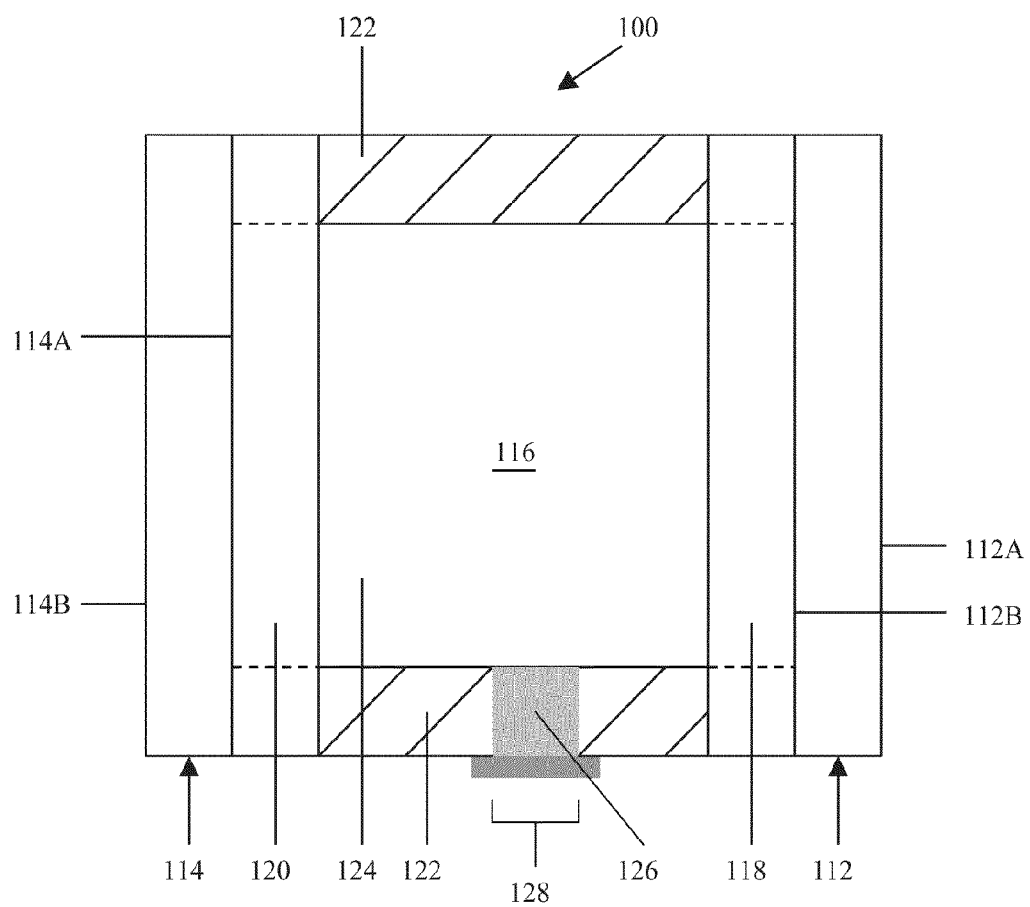
FIG. 2 is a cross-sectional schematic representation of an electrochromic device showing, among other things, a two-part plug associated with a fill port of a conventional seal member, according to one embodiment.
Figure 3:
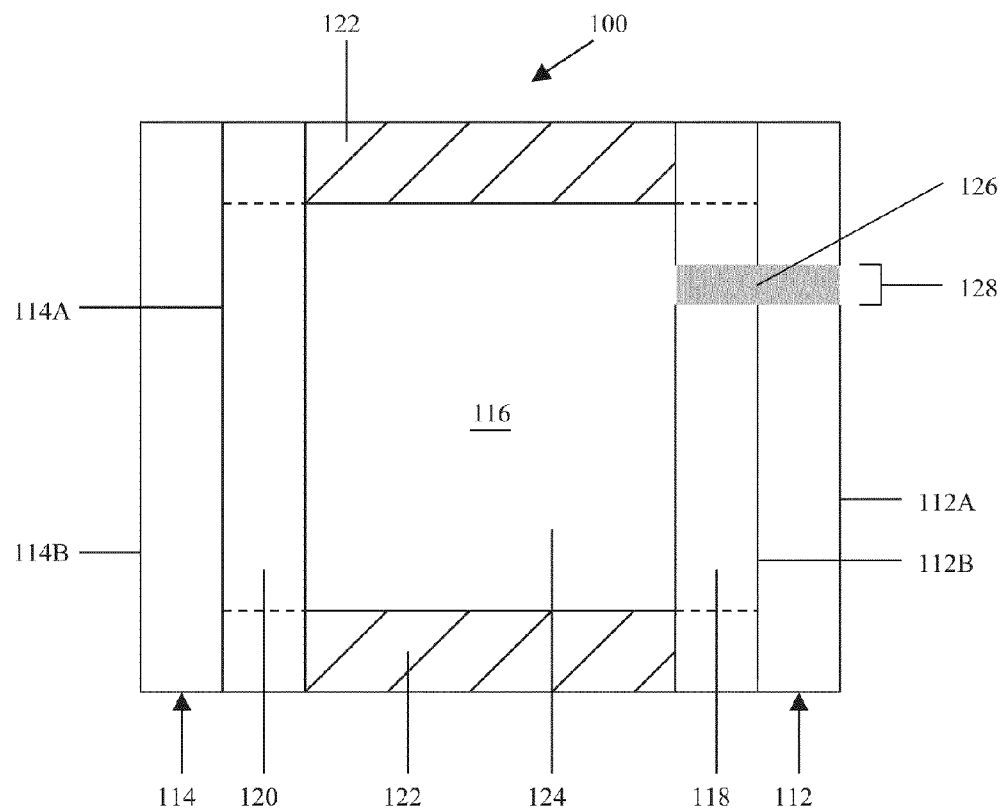
FIG. 3 is a cross-sectional schematic representation of an electrochromic device showing, among other things, a plug associated with a fill port of a substrate, according to one embodiment.
Figure 4:
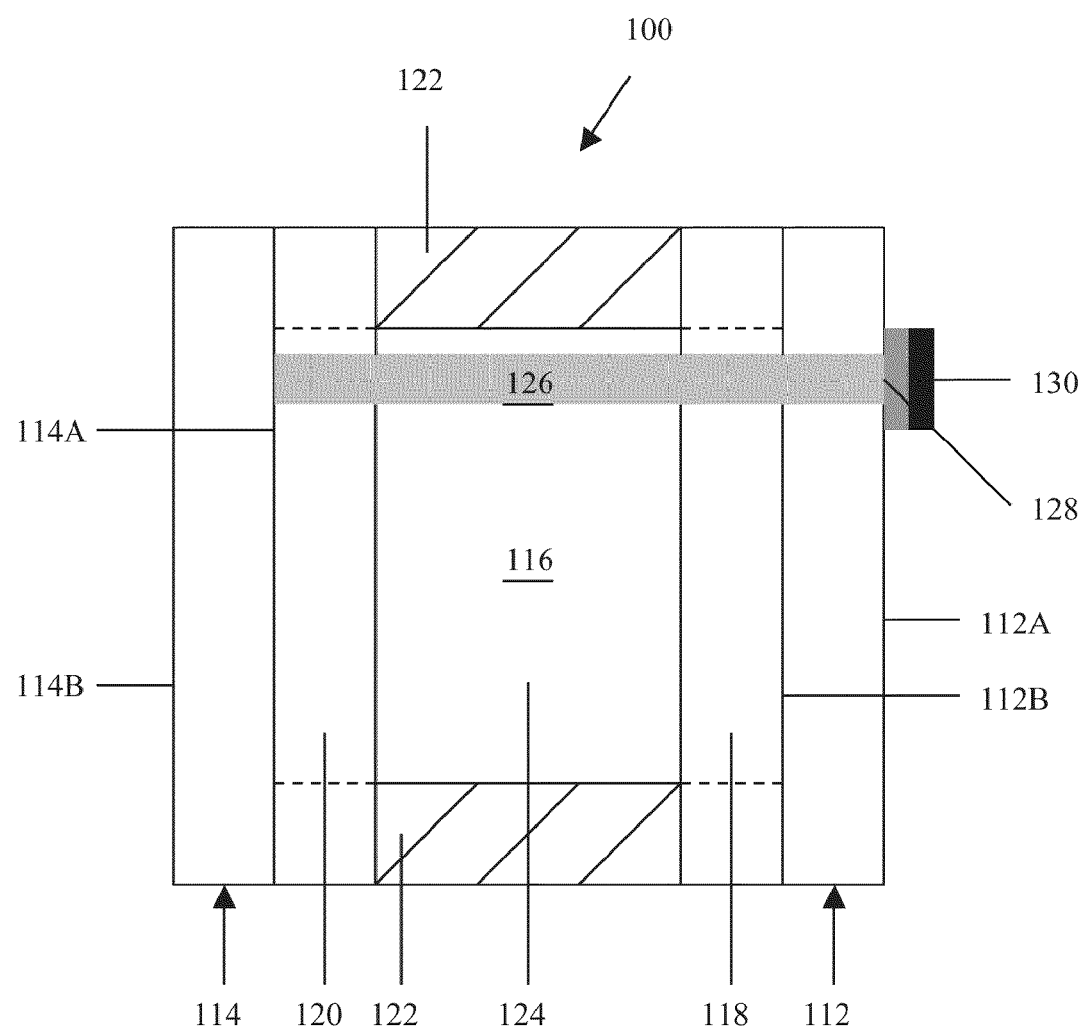
FIG. 4 is a cross-sectional schematic representation of an electrochromic device showing, among other things, a two-part plug associated with a fill port of a substrate, according to one embodiment.
Figure 5:
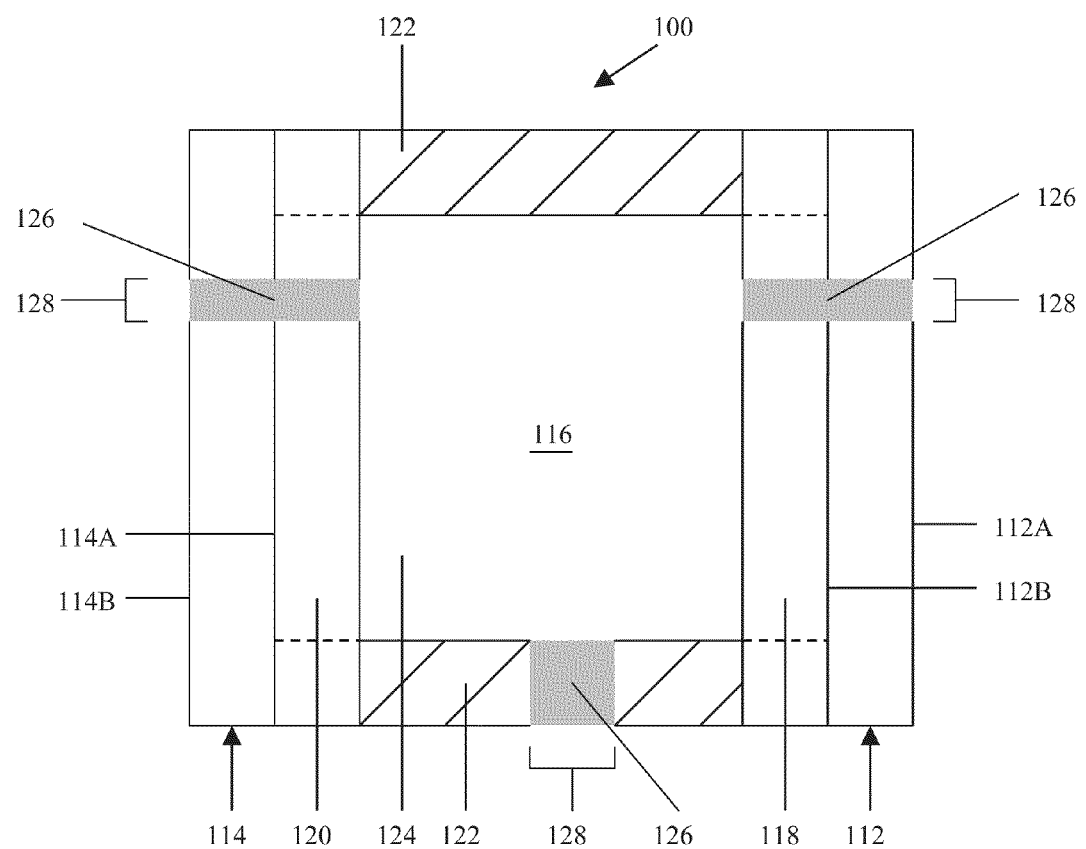
FIG. 5 is a cross-sectional schematic representation of an electrochromic device showing, among other things, a plug associated with a fill port of a first substrate, a second substrate, and a seal member, according to one embodiment.
Figure 6:
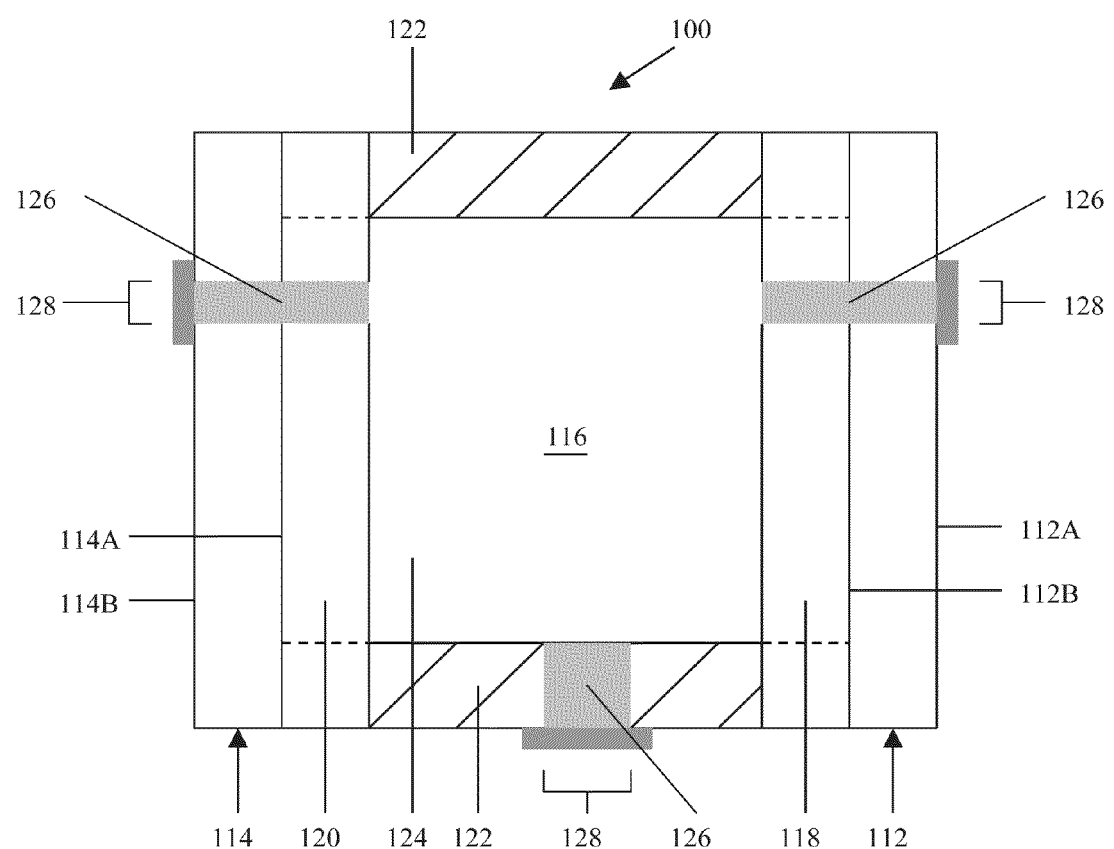
FIG. 6 is a cross-sectional schematic representation of an electrochromic device showing, among other things, a two-part plug associated with a fill port of a first substrate, a second substrate, and a seal member, according to one embodiment.
Figure 7:
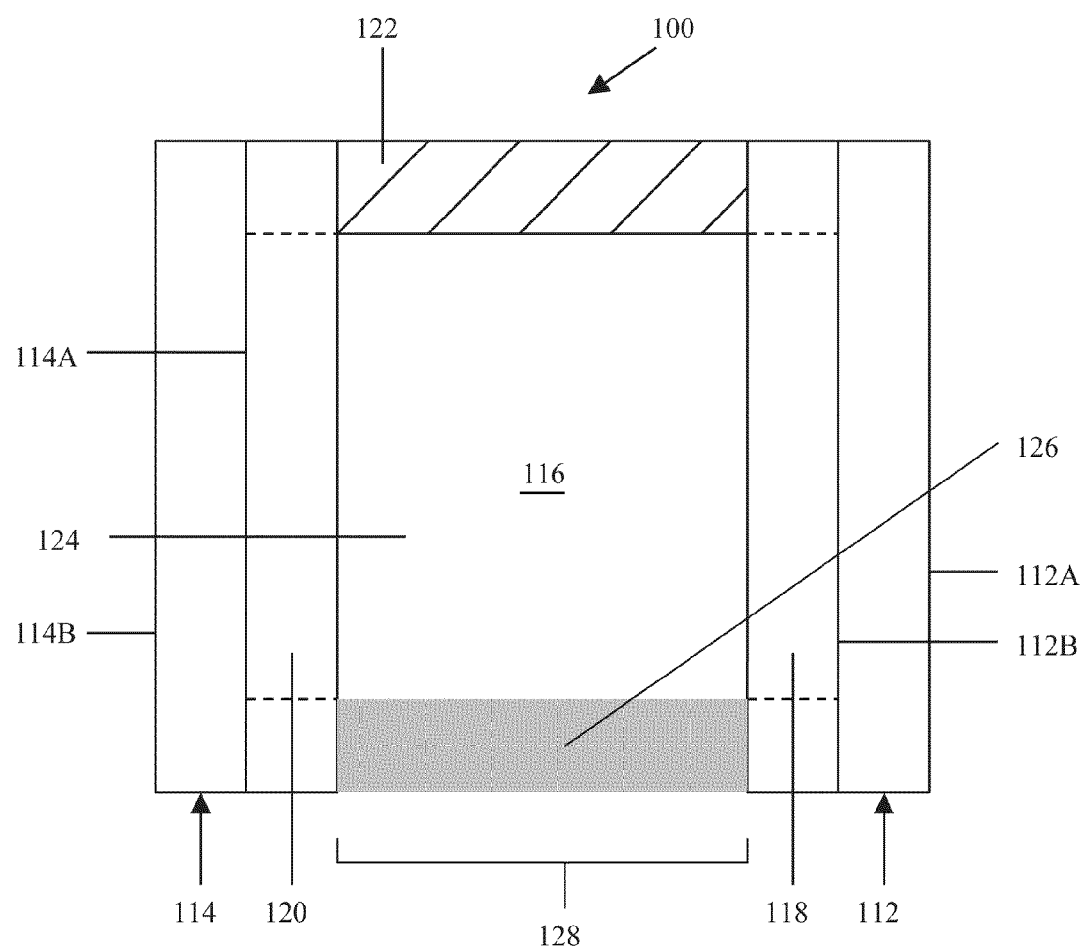
FIG. 7 is a cross-sectional schematic representation of an electrochromic device showing, among other things, a plug associated with a fill port, according to one embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, in general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; ethers; urethanes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; enamines; imides; isocyanates; isothiocyanates; cyanates; thiocyanates; imines; nitro groups; nitriles (i.e., CN); and the like.

Alkyl groups, as used herein, include straight chain and branched alkyl groups having from 1 to 20 carbon atoms, and typically from 1 to 12 carbons or, in some embodiments, from 1 to 8, 1 to 6, or 1 to 4 carbon atoms. Alkyl groups further include cycloalkyl groups having 3 to 8 ring members. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Cycloalkyl groups, as used herein, are cyclic alkyl groups such as, but not limited to, cyclopropyl, cyclobutyl, cyclopentyl, cyclohexyl, cycloheptyl, and cyclooctyl groups, and also include bridged cycloalkyl groups. Representative substituted alkyl groups can be unsubstituted or substituted.

In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups can be substituted one or more times with, non-hydrogen and non-carbon groups as defined above. However, substituted cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4-2,5- or 2,6-disubstituted cyclohexyl groups, which can be substituted with substituents such as those listed above. Cycloalkyl groups can also be bridged cycloalkyl groups in which two or more hydrogen atoms are replaced by an alkylene bridge, wherein the bridge can contain 2 to 6 carbon atoms if two hydrogen atoms are located on the same carbon atom, or 1 to 5 carbon atoms, if the two hydrogen atoms are located on adjacent carbon atoms, or 2 to 4 carbon atoms if the two hydrogen atoms are located on carbon atoms separated by 1 or 2 carbon atoms. Bridged cycloalkyl groups can be bicyclic, such as, for example bicyclo[2.1.1]hexane, or tricyclic, such as, for example, adamantyl. Representative bridged cycloalkyl groups include bicyclo[2.1.1]hexyl, bicyclo[2.2.1]heptyl, bicyclo[3.2.1]octyl, bicyclo[2.2.2]octyl, bicyclo[3.2.2]nonyl, bicyclo[3.3.1]nonyl, bicyclo[3.3.2]decanyl, adamantyl, noradamantyl, bornyl, or norbornyl groups. Substituted bridged cycloalkyl groups can be unsubstituted or substituted one or more times with non-hydrogen and non-carbon groups as defined above. Representative substituted bridged cycloalkyl groups can be mono-substituted or substituted more than once, such as, but not limited to, mono-, di- or tri-substituted adamantyl groups, which can be substituted with substituents such as those listed above.

Alkenyl groups, as used herein, include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, $-CH=CH(CH_3)$, $-CH=C(CH_3)_2$, $-C(CH_3)=CH_2$, $-C(CH_3)=CH(CH_3)$, $-CH=CHCH=CH_2$, $-C(CH_2CH_3)=CH_2$, cyclohexenyl, cyclopentenyl, cyclohexadienyl, butadienyl, pentadienyl, and hexadienyl, among others. Alkenyl groups may be substituted or unsubstituted. Representative substituted alkenyl groups can be mono-substituted or substituted more than once, such as, but not limited to, mono-, di- or tri-substituted with substituents such as those listed above.

Aryl groups, as used herein, are cyclic aromatic hydrocarbons that do not contain heteroatoms. Aryl groups include monocyclic, bicyclic and polycyclic ring systems. Thus, aryl groups include, but are not limited to, cyclopentadienyl, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 5-14 carbons, and in others from 5 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Aryl groups may be substituted or unsubstituted. Representative substituted aryl groups can be mono-substituted or substituted more than once. For example, monosubstituted aryl groups include, but are not limited to, 2-, 3-, 4-, 5-, or 6-substituted phenyl or naphthyl groups, which can be substituted with substituents such as those listed above. Aralkyl groups are alkyl groups having an aryl group attached, while alkaryls are aryl compounds having an alkyl group attached.

Alkoxy groups, as used herein, are hydroxyl groups (—OH) in which the bond to the hydrogen atom is replaced by a bond to a carbon atom of a substituted or unsubstituted alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Two subsets of alkoxy groups are "aryloxy" and "arylalkoxy," as used herein, refer to, respectively, a substituted or unsubstituted aryl group bonded to an oxygen atom and a substituted or unsubstituted aralkyl group bonded to the oxygen atom at the alkyl. Alkoxy groups may be substituted or unsubstituted. Representative substituted alkoxy groups can be substituted one or more times with substituents such as those listed above.

Unless otherwise specifically defined, a "heteroaryl" is an unsaturated ring structure having about 5 to about 8 ring members independently selected from carbon atoms and one or more heteroatoms, including oxygen, nitrogen, phosphorous and/or sulfur, for example, thiophene, oxazole, isoxazole, imidazole, pyrazole, benzimidazole, triazolopyridine, benzotriazole, pyridine, pyridine 1-oxide, pyrimidine, indole, indazole, furan, quinoline, 1,2,4-triazole, 1,2,3-triazole, imidazole, tetrazole, 1H-pyrrolo[2,3-c]pyridine, 1H-pyrrolo[2,3-b]pyridine, 1-(cyclohexylmethyl)-1H-benzo[d]imidazole, 1-((1-methylpiperidin-2-yl)methyl)-1H-indole, 2,3,4,9-tetrahydro-1H-carbazole, 1,2,3,4-tetrahydropyrrolo[3,4-b]indole, 4-(alkylsulfonyl)-1,2,3,4-tetrahydropyrrolo[3,4-b]indole, quinazolin-4(3H)-one, 4-((1H-indol-1-yl)methyl)tetrahydro-2H-thiopyran 1,1-dioxide, isoindolin-1-one, nucleosides and their derivatives. The heteroaromatic ring can be unsubstituted, singly substituted or, if possible, multiply substituted, with substituent groups in any possible position. In certain embodiments, the heteroaryl group will be fused to a carbocyclic group having 5 to 8 ring atoms, for example as in 4,5,6,7-tetrahydrobenzo[b]thiophene, 4,4a,5,5a-tetrahydro-1H-cyclopropa[4,5]cyclopenta[1,2-c]pyrazole and 4,5,6,7-tetrahydro-1H-indole. In certain embodiments, the heteroaryl group will be fused to a heterocyclic ring having from 5 to 8 ring atoms, for example as in 5,6,7,8-tetrahydroquinoline.

Unless otherwise specifically defined, "heterocyclyl" refers to a saturated or unsaturated ring structure having about 3 to about 8 ring members independently selected from carbon atoms and one or more heteroatoms, including oxygen, nitrogen, phosphorous and/or sulfur; for example, azetidine, piperidine, morpholine, piperazine, (S) and (R)-1,2-dimethylpiperazine, 1-H-pyridine-2-one, dihydropyridine, tetrahydropyridine, pyridazin-3(2H)-one, piperidine-2,4-dione, pyrrolidine, thiomorpholine, 1,1-dioxothiomorpholine, tetrahydro-2H-thiopyran 1,1-dioxide, nucleosides and their derivatives. The heterocyclic ring can be unsubstituted, singly substituted or, if possible, multiply substituted, with substituent groups in any possible position.

As used herein, a "photosensitizer" is a material that is any compound that allows an epoxy resin to be cured in combination with a photoinitiator at longer wavelengths of electromagnetic radiation, as compared to curing of the epoxy resin with a photoinitiator without the photosensitizer.

In one aspect, electrochromic devices are provided. More particularly, electrochromic devices are provided having a first substrate, a second substrate, a seal member and/or a chamber which include a plug associated with a fill port. The plug includes a photoinitiator composition that may be cured or at least partially cured with at least one photoinitiator and at least one photosensitizer upon exposure to electromagnetic radiation having a wavelength from about 350 nm to about 420 nm. Also provided are one- or two-part plugs, wherein the plug includes a resin or mixture of resins that are substantially immiscible with an associated electrochromic medium while in the uncured state and which is at least partially cured with at least one photoinitiator and at least one photosensitizer upon exposure to electromagnetic radiation having a wavelength from about 350 nm to about 420 nm.

As used herein, "immiscible" refers the lack of blending or intermixing between the resin and the electrochromic medium into a homogeneous phase to any substantial amount in the time frame before the resin is cured.

It has now been surprisingly discovered that selective incorporation of one or more photoinitiators and one or more photosensitizers into the fill port plug formulation facilitates a sufficiently acceptable cure with substantially less energy input, and/or a more complete cure with similar energy input. This can decrease costs, increase plug curability compatibility, and minimize or eliminate plug failure. It has further been discovered that such a plug configuration is particularly compatible with not only a conventional seal member, but also a first substrate, a second substrate, and/or a chamber. It has also been discovered that such a plug configuration decreases curing time of the plug through uncoated and coated glass, as well as facilitates more complete curing through uncoated and coated glass, relative to conventional plug configurations. While not wishing to be bound by theory, it is believed that this is due, at least in part, to the bathochromic shift of the electromagnetic energy needed to cure this plug material through the coated glass substrate compared to a plug material with only the cation photoinitiator.

In another aspect, liquid resin monomers or oligomers for use in a plug formulation are selected such that they are generally not miscible and/or soluble with an associated electrochromic media, prior to curing of the plug. The solvents used in a typical solution phase electrochromic device are usually very polar in nature. Many uncured resins such as Bisphenol A or Bisphenol F epoxy resins are completely soluble in the liquid or ungelled electrochromic media, particularly when in contact for longer than one day. This means that as the uncured plug material is injected into the fill opening some of the plug material can dissolve into the electrochromic media before the plug can be cured. Generally, the larger the cell gap the more intermixing and dissolution occurs. The uncured plug material that dissolves into the electrochromic media is there for the life of the device and can cause premature device failure. Failure modes include electrode passivation, instability in UV, visible hazing of the electrochromic media and/or color change. Accordingly, in one aspect, resins are provided that are generally not miscible and/or soluble in the polar electrochromic media in shorter timeframes such as less than 10 minutes. If a plug material is formulated using such resins there is little or no intermixing of the uncured plug material and the electrochromic media prior to plug cure. If the immiscible plug material in the cured form does not have all of the attributes that are required of a plug material (such as low oxygen and moisture permeability, good adhesion, high temperature stability, etcetera) this material can be backed up with a secondary plug material of choice that has all these attributes without concern for its interaction with the electrochromic media.

Referring now to the drawings and to FIGS. 1-7 in particular, cross-sectional schematic representations of electrochromic devices 100 are shown, which generally have first substrate 112 having front surface 112A and rear surface 112B, second substrate 114 having front surface 114A and rear surface 114B, chamber 116 for containing electrochromic medium 124, and one or more plugs 126 associated with one or more fill ports 128. Electrochromic devices 100 may include, for illustrative purposes only, a window, an aircraft transparency, a mirror, a display device, and the like. It will be understood that like or analogous elements and/or components, and/or methods referred to herein, may be identified throughout the drawings with like reference characters. It will be further understood that FIGS. 1-7 are merely schematic representations of electrochromic devices 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," U.S. Pat. No. 6,597,489 entitled "Electrode Design For Electrochromic Devices," and U.S. Pat. No. 6,700,692 entitled "Electrochromic Rearview Mirror Assembly Incorporating A Display/Signal Light."

First substrate 112 may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®, which is commercially available from Ticona of Summit, N.J. The first substrate 112 may be fabricated from a sheet of glass having a thickness from about 0.10 millimeters (mm) to about 12.7 mm. In some embodiments, the first substrate 112 may be fabricated from a sheet of glass having a thickness from about 0.50 mm to about 1.50 mm. In some embodiments, the first substrate 112 may be fabricated from a sheet of glass having a thickness from about 0.60 mm to about 1.00 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices can be, during normal operation, exposed to extreme temperature variation as well as substantial UV radiation, emanating primarily from the sun. It will be further understood that first substrate 112 and/or second substrate 114 may include a UV absorbing layer and/or contain a UV absorbing material to help protect the substrate(s) and/or the electrochromic media from UV damage.

The second substrate 114 may be fabricated from similar materials as that of first substrate 112. However, if the electrochromic device is a mirror or includes a mirrored surface, then the requisite of substantial transparency is not necessary. As such, second substrate 114 may, alternatively, include polymers, metals, glass, and ceramics to name a few. The second substrate 114 may be fabricated from a sheet of glass or plastic having a thickness from about 0.10 mm to about 12.7 mm. In some embodiments, the second substrate 114 may be fabricated from a sheet of glass or plastic having a thickness from about 0.50 mm to about 1.50 mm. In some other embodiments, the second substrate 114 may be fabricated from a sheet of glass or plastic having a thickness from about 0.60 mm to about 1.00 mm. If first and second substrates 112 and 114, respectively, are fabricated from sheets of glass, then the glass can optionally be tempered, heat strengthened, chemically strengthened, and/or laminated prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/Ag/metal oxide, or other materials known to those having ordinary skill in the art.

Electrically conductive material 120 is associated with front surface 114A of second substrate 114, and is operatively bonded to electrically conductive material 118 by sealing member 122. As can be seen in FIGS. 1-7, once bonded, sealing member 122, plug 126 and/or the juxtaposed portions of electrically conductive materials 118 and 120 serve to generally define an inner peripheral geometry of chamber 116. Alternatively, edge sealing techniques may be utilized which are disclosed in U.S. Pat. No. 7,372,611 entitled "Vehicular Rearview Mirror Elements And Assemblies Incorporating These Elements."

Electrically conductive material 120 may vary depending upon the intended use of the electrochromic device. For example, if the electrochromic device is a mirror, then the material may include a transparent conductive coating similar to electrically conductive material 118 (in which case a reflector is associated with rear surface 114B of second substrate 114). Alternatively, electrically conductive material 120 may include a layer of reflective material in accordance with the teachings of U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

The cell spacing between inner surfaces of substrates 112 and 114 may be from about 10 microns ($\mu m$) to about 750 $\mu m$. In some embodiments, the cell spacing between inner surfaces of substrates 112 and 114 may be from about 20 $\mu m$ to about 600 $\mu m$. However, it will be understood that the thickness of the cell spacing will depend largely upon the particular application of the electrochromic device.

Sealing member 122 may include any material that is configured to be adhesively bonded to the electrically conductive materials 118 and 120 to, in turn, seal chamber 116, (in certain embodiments in cooperation with plug 126 and fill port 128, see FIGS. 1, 2, 5, and 6) so that electrochromic medium 124 does not inadvertently leak out of the chamber. As is shown in dashed lines in FIGS. 1-7, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 bonds to glass. It will be understood that sealing member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," U.S. Pat. No. 6,157,480 entitled "Seal For Electrochromic Devices," and U.S. Pat. No. 6,714,334, entitled "Electrochromic Device Having A Seal Including An Epoxy Resin Cured With A Cycloaliphatic Amine."

For purposes of the present disclosure, and as will be explained in greater detail herein below, electrochromic medium 124 typically include at least one solvent, at least one anodic material, and at least one cathodic material.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 may be single-layer, single phase, multi-layer; or multi-phase. In single-layer, single-phase media the electrochromic medium may include a single-layer of material which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 and International Patent Application Serial No. PCT/US98/05570 both of which are hereby incorporated herein by reference in their entirety.

More than one anodic and cathodic material can be combined to give a pre-selected color as described in U.S. Pat. Nos. 5,998,617; 6,020,987; 6,037,471; and 6,141,137.

The anodic and cathodic materials may also be combined or linked by a bridging unit as described in U.S. Pat. Nos. 6,241,916 and 6,519,072. The electrochromic materials may also include near-infrared (NIR) absorbing compounds as described in U.S. Pat. No. 6,193,912.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369. The concentration of the electrochromic materials can be selected as taught in U.S. Pat. No. 6,137,62.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices."

In a multi-layer media, the medium may be made up in layers and includes a material attached directly to an electrically conducting electrode or confined in close proximity thereto which remains attached or confined when electrochemically oxidized or reduced.

In a multi-phase media, one or more materials in the medium undergoes a change in phase during the operation of the device, for example a material contained in solution in the ionically conducting electrolyte forms a layer on the electrically conducting electrode when electrochemically oxidized or reduced.

In addition, electrochromic medium 124 may include other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505 B1 entitled "Color-Stabilized Electrochromic Devices." Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2-hydroxy-5-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyoxalanilide sold by Sandoz Color & Chemicals under the trademark Sanduvor VSU, and the like.

As used herein, "anodic materials" may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Illustrative examples of anodic materials may include, but are not limited to, di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethylammoniumbutyl)-triphenodithiazinebis(tetrafluoroborate) in U.S. Pat. No. 6,710,906 B2. It is also contemplated that the anodic material may include a polymer film, such as polyaniline, polythiophenes, polymeric metallocenes, or a solid transition metal oxide, including, but not limited to, oxides of vanadium, nickel, iridium, as well as numerous heterocyclic compounds, and the like. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," and U.S. Pat. No. 6,710,906 B2 entitled "Controlled Diffusion Coefficient Electrochromic Materials For Use In Electrochromic Mediums And Associated Electrochromic Devices."

As used herein, "cathodic materials" may include, but are not limited to, viologens, such as methyl viologen tetrafluoroborate, octyl viologen tetrafluoroborate (octylviologen), or benzyl viologen tetrafluoroborate, ferrocinium salts, such as (6-(tri-tertbutylferrocinium) hexyl)triethylammonium di-tetrafluoroborate (TTBFc+)—see U.S. Pat. No. 7,046,418 entitled "Reversible Electrodeposition Devices And Associated Electrochemical Media" for synthesis. It will be understood that the preparation and/or commercial availability for each of the above-identified cathodic materials is well known in the art. See, for example, "The Bipyridinium Herbicides" by L A Summers (Academic Press 1980). While specific cathodic materials have been provided for illustrative purposes only, numerous other conventional cathodic materials are likewise contemplated for use including, but by no means limited to, those disclosed in previously referenced and incorporated U.S. Pat. No. 4,902,108, U.S. Pat. No. 6,188,505, and U.S. Pat. No. 6,710,906. Moreover, it is contemplated that the cathodic material may include a polymer film, such as various substituted polythiophenes, polymeric viologens, an inorganic film, or a solid transition metal oxide, including, but not limited to, tungsten oxide.

For illustrative purposes only, the concentration of the anodic and/or cathodic materials may be from about 1 millimolar (mM) to about 500 mM. In some embodiments, the concentration of the anodic and/or cathodic materials may be from about 2 mM to about 100 mM. While particular concentrations of the anodic as well as cathodic materials have been provided, it will be understood that the desired concentration may vary greatly depending upon the geometric configuration of the chamber containing electrochromic medium 124.

A solvent of electrochromic medium 124 may include any one of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including betapropiolactone, gamma-butyrolactone, and gamma-valerolactone; carbonates including propylene carbonate, ethylene carbonate; and homogenous mixtures of any two or more such solvents. While specific solvents have been disclosed as being associated with the electrochromic medium, numerous other solvents that would be known to those having ordinary skill in the art having the present disclosure before them are likewise contemplated for use.

In one aspect, plug 126 is associated with fill port 128, which includes an epoxy resin or mixture of resins (or other resins provided herein) and which is at least partially cured with at least one photoinitiator and a photosensitizer upon exposure to electromagnetic radiation having a wavelength from about 350 nm to about 420 nm toward reducing cure time of plug 126 and/or increasing cure completeness and durability of plug 126 and/or compatibility of the same with electrochromic medium 124 and/or external atmospheric conditions. Such enhanced durability and/or compatibility reduces the likelihood of any materials within electrochromic medium 124 being compositionally compromised and/or from inadvertently leaking out of chamber 116 through fill port 128.

It will be understood that during normal fabrication of electrochromic device 100, fill port 128 is utilized to introduce electrochromic medium 124 into chamber 116 of electrochromic device 100. In certain embodiments (e.g. FIGS. 1, 2) partially fabricated electrochromic device 100 is placed with fill port 128 downward in an empty container or trough in a vacuum vessel and evacuated. Electrochromic medium 124 is introduced into the trough or container in a manner such that fill port 128 is submerged. The vacuum vessel is then backfilled, which forces electrochromic medium 124 through fill port 128 and, ultimately, into chamber 116. In certain other embodiments, (e.g. FIGS. 3, 4), partially fabricated electrochromic device 100 is placed with fill port 128 upward in a vacuum vessel and evacuated. Electrochromic medium 124 is introduced into the container via conventional conduit in a manner such that fill port 128 is not submerged. Fill port 128 is then plugged with a photo curing epoxy resin, (e.g. plug 126) which is at least partially cured with a novel photoinitiator formulation. Such curing may be accomplished via a UV lamp. Additional discussions relative to the fabrication process of certain embodiments of electrochromic devices 100 are disclosed in U.S. Pat. No. 6,700,692.

In one embodiment, the formulation of plug 126 may include an epoxy resin or mixture of any two or more resins (e.g. cycloaliphatic epoxy resins including, for example, Omnilane OC1005, which is available from IGM Resins Inc., Bartlett, Ill., aromatic epoxy resins including, for example, Bis-F, Bis-A, Bis-A/F, modified Bis-A/F and/or epoxy novolac resins including, for example, DER 317, DER 321, DER 323, DER 324, DER 330, DER 331, DER 331J, DER 332, DER 336, DER 351 DER 352, DER 354, DER 353, DER 356, DER 358, DER 383, DEN 431, XZ 92512.00, XZ92466.00, and XQ 82940.01, which are all available from The Dow Chemical Company—all of which may be optionally filled with fumed silica, fumed silica treated with polydimethylsiloxane (TS-720—Cabot Corporation), or other fillers such as clay fillers, glass beads, calcium carbonate, aluminum oxide, calcium fluoride, or other fillers as desired) which are at least partially cured using one or more photoinitiators and one or more photosensitizers.

Examples of suitable cationic photoinitiators include, but are not limited to, phosphate photoinitiators, antimonate photoinitiators, and combinations thereof, such as, but not limited to, sulfonium antimonates, arylsulfonium antimonates, triarylsulfonium antimonates, triarylsulfonium hexafluoroantimonates, mixed triarylsulfonium hexafluoroantimonates, iodonium antimonates, aryliodonium antimonates, biaryliodonium antimonates, biaryliodonium hexafluoroantimonates, sulfonium phosphates, arylsulfonium phosphates, triarylsulfonium phosphates, triarylsulfonium hexafluorophosphates, mixed triarylsulfonium hexafluorophosphates, iodonium phosphates, aryliodonium phosphates, biaryliodonium phosphates, biaryliodonium hexafluorophosphates, and combinations thereof. The cationic photoinitiator may be represented as the structure of Formula (I):

wherein $R_1$-$R_2$ are individually H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing about 1 to about 50 carbon atom(s) and combinations thereof; and wherein [X]⁻ includes $AsF_6^-$, $SbF_6^-$, $PF_6^-$, $Ga(C_6F_5)_4^-$, $B(C_6F_5)_4^-$, 7,8,9,10,11,12-$CB_{11}H_6Br_6^-$, $(C_6F_5)_3B^-(C_6F_4)B^-(C_6F_5)_3$, perfluorobutane sulfonate, p-toluene sulfonate, trifluoromethanesulfonate, nitrate, borates,

, and other compatible ions. In some embodiments, $R^1$ and $R^2$ are individually aryl or alkaryl. In any such other embodiments, $R^1$ and $R^2$ are individually, phenyl, a 2-($C_1$-$C_{10}$ alkyl)phenyl, a 3-($C_1$-$C_{10}$ alkyl)phenyl, a 4-($C_1$-$C_{10}$ alkyl)phenyl, or a bis($C_1$-$C_{10}$ alkyl)phenyl. One cationic photoinitiator which is commercially available from CIBA Specialty Chemicals is of Formula II:

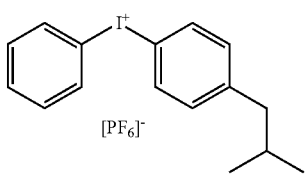

(II)

Non-limiting examples of suitable non-ionic, photosensitizers include compounds represented by Formula III:

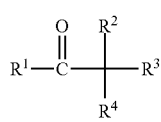

(III)

wherein $R_1$-$R_4$ are individually H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing about 1 to about 50 carbon atom(s) and combinations thereof. In some embodiments, $R^1$ and $R^3$ are individually aryl or alkaryl. In any such other embodiments, $R^1$ and $R^3$ are individually, phenyl. In some embodiments, $R^2$ and $R^4$ are individually alkyl, hydroxy, or alkoxy. In any such other embodiments, $R^2$ and $R^3$ may be a $C_1$-$C_4$ alkoxy. One photosensitizer, commercially available from CIBA Specialty Chemicals as CIBA® Irgacure® 651, i.e. 2,2-dimethoxy-1,2-diphenylethan-1-one, is the compound represented by Formula (IV):

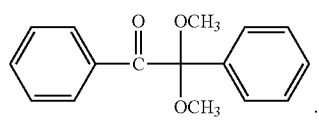

(IV)

Other photosensitizers, used alone or in combination with any of the above photosensitizers include, xanthones (substituted or unsubstituted), thioxanthones (substituted or unsubstituted), anthracene, acetophenone, 4-cyanoacetophenone, benzophenone, perylene, phenothiazine, or a combination of any two or more thereof.

Illustrative substituted thioxanthones include, but are not limited to 1-chloro-4-propoxy-9H-thioxanthen-9-one, 2,4-diethyl-9H-thioxanthen-9-one, 2-isopropyl-9H-thioxanthen-9-one, 4-isopropyl-9H-thioxanthen-9-one, and 2-chlorothioxanthen-9-one.

In another aspect, a method is provided for manufacturing an electrochromic device, the method including providing an electrochromic device including a first substantially transparent substrate having an electrically conductive material associated therewith; a second substrate having an electrically conductive material associated therewith; and an electrochromic medium contained within a chamber positioned between the first and second substrates. The chamber may include at least one solvent; at least one anodic material; and at least one cathodic material, wherein both of the anodic and cathodic materials are electroactive and at least one of the anodic and cathodic materials is electrochromic. The method further includes at least partially closing a fill port associated with at least one of a seal member, the first substrate, the second substrate, and the chamber with an uncured plug; and exposing the uncured plug to electromagnetic radiation having a wavelength from about 350 nm to about 420 nm to, in turn, substantially convert the plug from an uncured state to an cured state. In some embodiments, the wavelength of the electromagnetic radiation is from about 350 nm to about 400 nm.

In another aspect, plug 126 is associated with fill port 128, which includes an epoxy resin or mixture of resins (or other resins provided herein) and which is at least partially cured with a cationic photoinitiator and a photo sensitizer to enhance durability of plug 126, and/or enhance the compatibility of the plug with electrochromic medium 124. Such enhanced durability and/or compatibility may reduce the likelihood of any materials within electrochromic medium 124 from being compositionally compromised and/or from inadvertently leaking out of chamber 116 through fill port 128. Fill port 128 may include an aperture from about 1 mm to about 2 mm.

The formulation of plug 126 may include an epoxy resin or mixture of resins which are at least partially cured using one or more photoinitiators, such as, but not limited to, a sulfonium, an arylsulfonium, a triarylsulfonium, a triarylsulfonium, a mixed triarylsulfonium hexafluoroantimonate, and combinations of two or more thereof. The sulfonium group may be represented by one or more of Formulas V, VI, or VII:

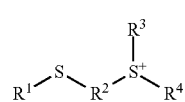

(V)

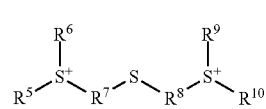

(VI)

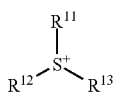
(VII)

wherein $R_1$-$R_{13}$ are individually H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing about 1 to about 50 carbon atom(s) and combinations thereof. In each of the compounds of Formulas V, VI, and VII, the cation may be balanced by an anion $[X]^-$ that may be $AsF_6^-$, $SbF_6^-$, $PF_6^-$, $Ga(C_6F_5)_4^-$, $B(C_6F_5)_4^-$, 7,8,9,10,11,12-$CB_{11}H_6Br_6^-$, $(C_6F_5)_3B^-(C_6F_4)B^-(C_6F_5)_3$, perfluorobutane sulfonate, p-toluene sulfonate, trifluoromethanesulfonate, nitrate, borates,

or other compatible ions.

Specific examples of sulfonium compounds which are commercially available from Union Carbide Corporation include:

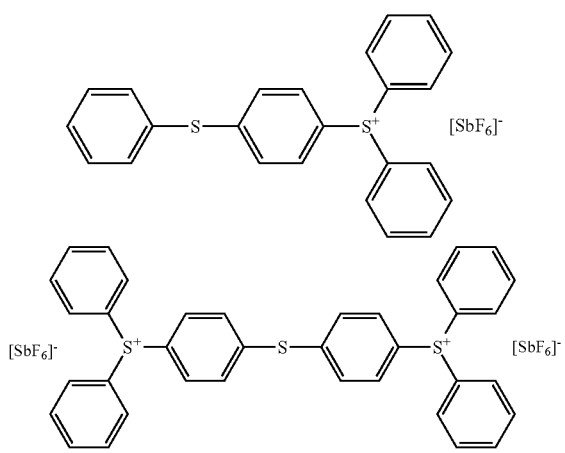

In another embodiment, the formulation of plug 126 includes an epoxy resin which is at least partially cured using one or more photoinitiators, such as, for example, an iodonium, an aryliodonium, a bisaryliodonium, a bisaryliodonium compound, or a mixture of any two or more thereof.

In some embodiments, the iodonium compound may be represented Formula I:

(I)

wherein $R_1$-$R_2$ are individually H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing about 1 to about 50 carbon atom(s) and combinations thereof, and where $[X]^-$ is $AsF_6^-$, $SbF_6^-$, or $PF_6^-$.

Specific examples of iodonium compounds which are commercially available from Gelest Inc. include:

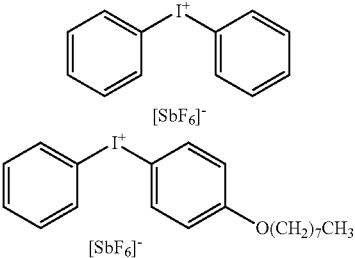

While specific photoinitiators have been disclosed, for illustrative purposes only, it will be understood that any one of a number of initiators may be used.

While specific anionic salts of photoinitiators have been disclosed, for illustrative purposes only, it will be understood that any one of a number of other anions may be used, including, for example, $AsF_6^-$, $SbF_6^-$, $PF_6^-$, $Ga(C_6F_5)_4^-$, $B(C_6F_5)_4^-$, 7,8,9,10,11,12-$CB_{11}H_6Br_6^-$, $(C_6F_5)_3B^-(C_6F_4)B^-(C_6F_5)_3$, perfluorobutane sulfonate, p-toluene sulfonate, trifluoromethanesulfonate, nitrate, borates,

and other compatible ions.

In some embodiments, the anion for the photo initiator may be an antimonite. Without being bound to any one particular theory, it is believed that the antimonate facilitates better cross-linked density within plug 126, thereby enhancing at least durability of the same. It is further believed that the antimonate containing photoinitiator form a stronger acid than with a conventional counter ion, such as hexafluorophosphate or tetrafluoroborate.

In another embodiment, the formulation of plug 126 may include a resin or mixture of resins (e.g. epoxy resins, such as epoxidized polybutadienes, epoxidized castor oil, epoxidized cashew nut oil, acrylated butadiene resins, silanes, siloxanes, block resins, urethanes, rubbers having a low glass transition temperature (e.g. Tg<25° C.) among others provided herein) that are substantially immiscible with an associated electrochromic medium (i.e. 124) while in the uncured state. It will be understood that the term "substantially" with respect immiscible will be defined herein, regardless of its ordinary meaning, as immiscible so that the short and/or long term performance of the associated device is not adversely affected. Such materials will exhibit sufficient flexibility for use in their intended purpose, namely as a plug. By way of supporting example, the resin or mixture of resins may include Sartomer CN-301, Sartomer CN-304, and/or Rahn BR-643.

It will be understood that resins, other than acrylated (Sartomer CN-301), methacrylated (Sartomer CN-304) or epoxidized polybutabiene, can be used in a plug formulation that are at least substantially immiscible in the electrochromic media. Other immisicble monomers or oligomers available from Sartomer include, but are not limited to, CN-986 (aliphatic urethane acrylate), CN-2252 (polyester acrylate), CN-934 (aliphatic urethane acrylate), CN-975 (hexafunctional urethane acrylate), CN-965 (aliphatic urethane acrylate), CN-981 (aliphatic urethane acrylate), CN-973 (aromatic urethane acrylate), SR-489 (tridecyl acrylate) and SR-335 (lauryl acrylate).

In another embodiment, the formulation of plug 126 includes two-parts, namely; a first sub-component including a resin or mixture of resins (e.g. silanes, siloxanes, polybutadienes, block resins, urethanes, rubbers having a low glass transition temperature (e.g. Tg<25° C.), epoxy resins, acrylated butadiene resins, among other provided supra and infra) that are substantially immiscible with an associated electrochromic medium (i.e. 124) while in the uncured state, and a second-subcomponent including a resin or mixture of resins (e.g. epoxy resins, urethane resins, phenolic resins, acrylic resins, cured at room temperature, thermally and/or with radiation, among other provided supra and infra) that exhibit desired permeability, adhesion, and/or stability characteristics. It will be understood that the second-subcomponent may also be compositionally analogous to seal member 122. In particular, the permeability of the second-subcomponent protects electrochromic medium 124 from air and/or moisture if the first subcomponents exhibits permeability to air and/or moisture. Furthermore, the second subcomponent adheres to at least the first-subcomponent toward maintaining device integrity over long periods of time—including one or more decades depending upon the application of the particular electrochromic device.

Additional non-limiting examples of resins that are suitable for use as second-subcomponent resins and/or resins cured with a photo initiator and a photosensitizer include conventional aliphatic amines, cycloaliphatic amines, amidoamines, mercaptans, cycloaliphatic epoxy resins such as Omnilane OC1005, which is available from IGM Resins Inc., Bartlett, Ill., aromatic epoxy resins such as Bis-F, Bis-A, and/or epoxy novolac resins such as DER 354, DER 332, and DEN 431, which are all available from the Dow Chemical Company, as well as thermal and/or photoinitiators, and optionally filled with fumed silica or other fillers such as clay fillers, glass beads, calcium carbonate, aluminum oxide, carbon black, etcetera, using conventional techniques.

It will be understood that the first sub-component of plug 126 can be introduced into fill port 128 which is generally compatible with the components of electrochromic medium 124 and subsequently cured. It will be further understood that the first sub-component of plug 126 may contact front surface 114A of second substrate 114 and/or electrically conductive material 120 (See FIG. 4). Next, the outer surface of the first sub-component, the outer surface of the first substrate and/or the surrounding area can be chemically modified to improve adhesion via, for example, silane primer, cleaned, abraded (e.g. mechanically) and/or etched if desired, prior to association of the second sub-component. Etching can be accomplished by several techniques including mechanical etching such as sandblasting, sandpaper, and chemical etching—just to name a few. After optionally etching, the second sub-component of plug 126 can be associated with the outer surface area the first sub-component, the outer surface of the first substrate and/or the surrounding area which is generally compatible with external atmospheric conditions/parameters.

Slipcover 130 may be associated with plug 126. Slipcover 130 serves to enhance both the final aesthetics of plug 126, as well as complete the final lamination process. Slipcover 130 may be fabricated from glass, but may also be fabricated from any one of a number of metals, natural and/or synthetic resins including, but not limited to Mylar, plastics, and the like. It will be understood that slipcover 130 may also include a metal under layer to enhance impermeability, control transmissivity, and/or adhesion to associated surfaces. Slipcover 130 may include colored glass and/or plastics, and may also be made opaque via abrading, etching, and the like. Slipcover 130 may be less than 1 mm thick, in some embodiments. Slipcover 130 may be less than 0.85 mm thick, in some embodiments. Slipcover 130 may be less than 0.7 mm thick, in some embodiments. In one embodiment, slipcover 130 includes a substantially circular geometric cross-section having a diameter from about 5 mm to about 7 mm, which generally conforms to the outer peripheral geometry of the plug and which also improves design aesthetics, as well as device integrity compared to slipcovers that include one or more edges which may facilitate delamination via, for example, snagging of the edge on another component of the device or surrounding area.

It has been surprisingly discovered that the thickness of the second subcomponent of plug 126 impacts plug integrity and, in turn, device longevity. Indeed, it has been determined that when the thickness of the second sub-component of plug 126 above first substrate 112 is reduced from about 125-150 microns down to about 20 microns, for example, via a reduction in spacer bead size, a substantial enhancement in plug adhesion is observed. It will be understood that the spacer beads may be about 1-50 microns in diameter. In some embodiments, the spacer beads may be about 5-30 microns in diameter. In some embodiments, the spacer beads may be about 5-20 microns in diameter. The filler beads associated with the second sub-component of plug 126 may be fabricated from plastic beads, such as PMMA, hollow glass, spherical glass, metal beads, or other bead materials.

Slipcover 130 may be substantially parallel and/or parallel to first substrate 112. It will be understood that the term substantially as used herein with respect to the term parallel is defined as appearing to be parallel to an ordinary observer when viewed under a microscope at 10× magnification.

In another embodiment, the second sub-component of plug 126 further includes carbon black, which facilitates lower transmissivity—especially when the second sub-component of plug 126 is between about 10 and about 50 microns thick relative to surface 112A of first substrate 112.

When the thickness of the second sub-component of plug 126 above first substrate 112 is between about 10 and about 50 microns, a decrease in filler (e.g. fumes silica) concentration has also been recognized as a means to maintain desired viscosity during plug curing.

Plug 126 may optionally include one or more cure indicators which provide optical and/or measurable indication of the degree of plug curing. A first class of cure indicators may include pH based cure indicators, such as phenolphthalein (0.25-0.5 parts per hundred resin "phr") and thymolphthalein (0.25-0.5 phr), which are available from Aldrich Chemical Company. A second class of cure indicators may include free radical/reactive cure indicators such as Crystal Violet (0.25-0.5 phr), which is available from Aldrich Chemical Company. A third class of cure indicators may include UV cure indicators such as Blue 55 (1-5 phr), which is available from Spectra Group Limited, Inc., Millbury, Ohio. It will be understood that the concentrations of cure indicators provided above are merely operative concentrations, but are, in no way, limiting. To be sure, other concentrations that would be known to those having ordinary skill in the art are likewise contemplated for use. It will be further understood that utilization of plug cure indicators to the formulation is advantageous in a production setting to insure that plug 126 has been exposed to UV light and/or is in a properly cured state.

Plug 126 may further optionally include one or more additives, such as, but not limited to, tougheners (e.g. Fortegra 100

(1-5 wt %) available from The Dow Chemical Company and MX136 core-shell toughener (25 wt % in Bis-F epoxy) available from Kaneka Corporation, Pasedena, Tex.), flexibilizers/crosslinkers (e.g. H2003 dendritic polymer (1-20 wt %) or CAPA polyols (1-20 wt %) available from Perstorp Polyols, Inc, Toledo, Ohio), and/or surface active agents (e.g. UV3570 (0.5-2.5 wt %) available from BYK-Chemie, Germany) It will be understood that plug tougheners and flexibilizers/crosslinkers are functionally self-explanatory, and that surface active agents can reduce the surface tension of the plug formulation and help repel the electrochromic medium during the plugging operation and reduce intermixing.

The electrochromic devices can be used in a wide variety of applications wherein the transmitted or reflected light/heat can be modulated. Such devices include mirrors; aircraft transparencies; electrochromic eyewear; windows for the exterior of a building, home or vehicle; skylights for buildings including tubular light filters; windows in office or room partitions; and light filters for photographic devices and light sensors.

The present technology, thus generally described, will be understood more readily by reference to the following examples, which are provided by way of illustration and are not intended to be limiting.

EXAMPLES

It will be understood that, unless otherwise specified, the chemical reagents, reactants, and compounds provided herein below, or their precursors, are available from common commercial chemical vendors, such as Sigma-Aldrich Chemical Co., of St. Louis, Mo.

Example 1

A plug material was prepared according to the following formulation:

| Material | Weight % |
| --- | --- |
| Omnilane OC 1005 (ECC) | 92.56 |
| Cationic Photoinitiator (Diphenyliodonium hexafluorophosphate) | 1.56 |
| Photosensitizer (CIBA ® Irgacure ® 651) | 1.88 |
| Fumed Silica (CAB-O-SIL TS-720) | 4.0 |

To a mixing cup the epoxy resin is added, along with the cationic photoinitiator and the photosensitizer. The mixture is then spun at 2000 rpm for 100 seconds under vacuum to mix the materials. The fumed silica is then added to the mixture and the mixing is continued at 2000 rpm for 100 seconds under vacuum.

Figure 8:
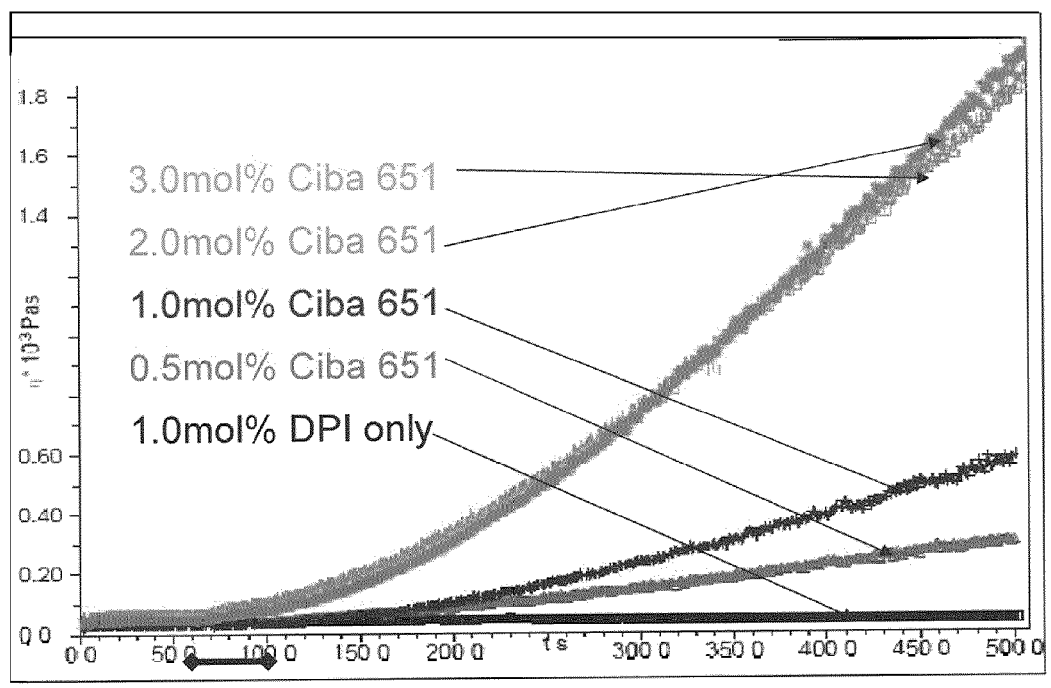
FIG. 8 is a two-dimensional plot showing the change in rheology characteristics as a function of time for Example 1.

FIG. 8 is a graph illustrating the complex viscosity of the plug material plotted vs. time. The figure illustrates how the addition of CIBA® Irgacure® 651 (2,2-dimethoxy-1,2-diphenylethan-1-one) as a photosensitizer to the diphenyliodonium initiator causes the complex viscosity of the plug to increase at a more rapid rate than when diphenyliodonium initiator is used on its own.

Examples 2-4

Plug materials were prepared according to the following formulations:

| Material | Example 2 (wt %) | Example 3 (wt %) | Example 4 (wt %) |
| --- | --- | --- | --- |
| D.E.R. ™ 354 (The Dow Chemical Company) | 91.35 | 91.98 | 87.43 |
| Cationic Photoinitiator (Diphenyliodonium hexafluorophosphate) | 2.49 | 2.51 | 0.0 |
| Cationic Photoinitiator (UVI-6976) | 0.0 | 0.0 | 6.57 |
| Photosensitizer (Thioxanthone) | 0.15 | 0.0 | 0.0 |
| Photosensitizer (CIBA ® Irgacure ® 651) | 0.0 | 1.51 | 0.0 |
| Fumed Silica (CAB-O-SIL TS-720) | 6.00 | 4.00 | 4.00 |

Figure 9:
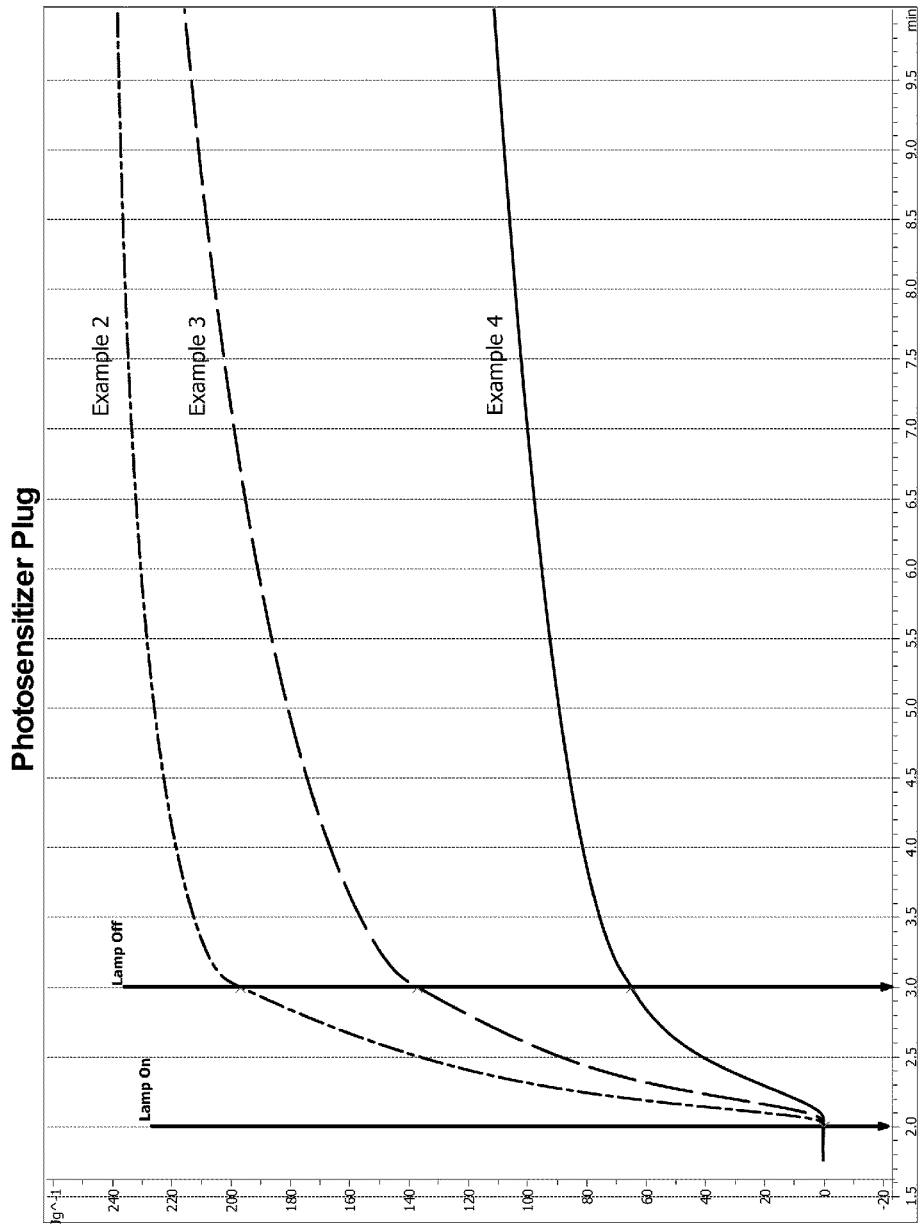
FIG. 9 is a UV DSC (ultraviolet-differential scanning calorimetry) graph of plug material Examples 2-4.

FIG. 9 is a UV DSC (ultraviolet-differential scanning calorimetry) graph of plug material Examples 2-4. A sample size of about 3 mg was used for each example in the UV DSC. The graph shows energy liberated during the curing reaction of the epoxy in units of J/g. The UV light is on for 1 minute from 2 to 3 minutes in the graph. Then the measurement is carried out to 10 minutes to capture the curing that happens after the UV light is turned off. It is observed that when the lamp is turned off, Example 4 has about 60 J/g of energy liberated. Example 3 which uses the CIBA® Irgacure® 651 photosensitizer has about 137 J/g liberated. Example 2 which uses the thioxanthone photosensitizer has about 195 J/g liberated. The photosensitized versions of the plug (Examples 2 and 3) liberate 2 to 3 times the energy of a non-photosensitized plug (Example 4).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochromic device, comprising:
a first substantially transparent substrate having an electrically conductive material associated therewith;
a second substrate having an electrically conductive material associated therewith;
an electrochromic medium contained within a chamber defined by the first and second substrates and a seal member joining the first and second substrates;
wherein:
at least one of a seal member, the first substrate, the second substrate comprises a fill port;
the fill port comprises a plug; and
the plug comprises the reaction product of an epoxy resin, at least one photoinitiator and at least one photosensitizer.

2. The electrochromic device of claim 1, wherein the epoxy resin comprises a bisphenol A epoxy resin, a bisphenol F epoxy resin, a bisphenol A/F epoxy resin, or a modified bisphenol A/F epoxy resin.

3. The electrochromic device of claim 1, wherein the photoinitiator is a cationic photoinitiator.

4. The electrochromic device of claim 3, wherein the cationic photoinitiator comprises a bisaryliodonium antimonate, a bisaryliodonium hexafluoroantimonate, a bisaryliodonium phosphate, a bisaryliodonium hexafluorophosphate, or a mixture of any two or more thereof.

5. The electrochromic device of claim 3, wherein the cationic photoinitiator is a compound represented by Formula I:

wherein:
R$^1$ is aryl;
R$^2$ is aryl; and
[X]$^-$ is AsF$_6^-$, SbF$_6^-$, PF$_6^-$, Ga(C$_6$F$_5$)$_4^-$, B(C$_6$F$_5$)$_4^-$, 7,8,9,10,11,12-CB$_{11}$H$_6$Br$_6^-$, (C$_6$F$_5$)$_3$B$^-$(C$_6$F$_4$)B$^-$(C$_6$F$_5$)$_3$, perfluorobutane sulfonate, p-toluene sulfonate, trifluoromethanesulfonate, nitrate, a borate, or

6. The electrochromic device of claim 5, wherein [X]$^-$ is AsF$_6^-$, SbF$_6^-$, or PF$_6^-$.

7. The electrochromic device of claim 3, wherein the cationic photoinitiator is(4-isobutylphenyl)(phenyl)iodonium hexafluorophosphate.

8. The electrochromic device of claim 1, wherein the photoinitiator is an iodonium photoinitiator.

9. The electrochromic device of claim 1, wherein the photosensitizer is non-ionic.

10. The electrochromic device of claim 1, wherein the photosensitizer is a compound represented by Formula III:

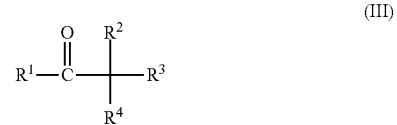

wherein: R$^1$, R$^2$, R$^3$, and R$^4$ are individually H, hydroxyl, alkyl, cycloalkyl, polycycloalkyl, heterocycloalkyl, alkaryl, alkoxy, aryl, aralkyl, alkenyl, alkynyl, or carbonyl.

11. The electrochromic device of claim 10, wherein R$^1$ and R$^3$ are aryl, and R$^2$ and R$^4$ are alkoxy.

12. The electrochromic device of claim 10, wherein the photosensitizer comprises 2,2-dimethoxy-1,2-diphenylethan-1-one.

13. The electrochromic device of claim 1, wherein the photosensitizer is a xanthone, a thioxanthone, or a mixture of any two or more thereof.

14. The electrochromic device of claim 1, wherein the plug further comprises fumed silica.

15. The electrochromic device of claim 1, wherein the electrochromic medium further comprises at least one of a cross-linked polymer matrix, a free-standing gel, and a substantially non-weeping gel.

16. The electrochromic device of claim 1, wherein the electrochromic medium further comprises a redox buffer.

17. The electrochromic device of claim 1, wherein the plug further comprises a cure indicator.

18. The electrochromic device of claim 1, wherein the device is an electrochromic window, an electrochromic aircraft transparency, or an electrochromic mirror.

19. An electrochromic device, comprising:
a first substantially transparent substrate having an electrically conductive material associated therewith;
a second substrate having an electrically conductive material associated therewith;
an electrochromic medium contained within a chamber positioned between the first and second substrates which comprises:
at least one solvent;
at least one anodic material; and
at least one cathodic material, wherein both of the anodic and cathodic materials are electroactive and at least one of the anodic and cathodic materials is electrochromic;
wherein:
  at least one of a seal member, the first substrate, the second substrate, and the chamber comprises a plug associated with a fill port;
  the plug comprises an epoxy resin; and
  the plug is at least partially cured with at least one cationic photoinitiator and at least one photosensitizer, photosensitizer that is a xanthone or a thioxanthone, upon exposure to electromagnetic radiation having a wavelength from about 350 nm to about 400 nm.

20. A method for manufacturing an electrochromic device, the method comprising:
providing an filled electrochromic device having an unplugged fill port;
injecting an uncured plug material into the fill port;
exposing the uncured plug material to electromagnetic radiation having a wavelength from about 350 nm to about 400 nm to substantially cure the plug material;
wherein:
  the uncured plug material comprises an epoxy resin, at least one photoinitiator and at least one photosensitizer.

* * * * *